(12) United States Patent
Liu et al.

(10) Patent No.: US 11,531,996 B2
(45) Date of Patent: Dec. 20, 2022

(54) METHOD FOR ANTI-COUNTERFEIT INSPECTION OF QR CODE OF AGRICULTURAL PRODUCT BASED ON WATERMARK LIBRARY

(71) Applicant: Anhui Agricultural University, Hefei (CN)

(72) Inventors: Fei Liu, Hefei (CN); Hao Li, Hefei (CN); Wenhao Ding, Hefei (CN); Qi Wu, Hefei (CN); Mengting Zeng, Hefei (CN); Yiqiong Chen, Hefei (CN); Youhua Zhang, Hefei (CN); Yunzhi Wu, Hefei (CN)

(73) Assignee: Anhui Agricultural University, Hefei (CN)

( * ) Notice: Subject to any disclaimer, the term of this patent is extended or adjusted under 35 U.S.C. 154(b) by 238 days.

(21) Appl. No.: 16/902,566

(22) Filed: Jun. 16, 2020

(65) Prior Publication Data

US 2021/0117983 A1    Apr. 22, 2021

(30) Foreign Application Priority Data

Oct. 18, 2019   (CN) .......................... 201910991205.3

(51) Int. Cl.
*G06Q 30/00*   (2012.01)
*G06K 19/06*   (2006.01)

(52) U.S. Cl.
CPC ... *G06Q 30/0185* (2013.01); *G06K 19/06037* (2013.01); *G06K 19/06046* (2013.01)

(58) Field of Classification Search
CPC ....... G06K 19/06037; G06K 19/06046; G06K 17/00; G06T 1/0021; G06T 2201/0065; G06Q 30/0185
See application file for complete search history.

(56) References Cited

U.S. PATENT DOCUMENTS

| | | | |
|---|---|---|---|
| 9,760,818 B2 * | 9/2017 | Asthana | G06K 7/1434 |
| 2012/0272279 A1 * | 10/2012 | Lim | H04N 21/8146 |
| | | | 725/109 |

FOREIGN PATENT DOCUMENTS

CN       107194449 A  *  9/2017  ....... G06K 19/06046

* cited by examiner

*Primary Examiner* — Sonji N Johnson
(74) *Attorney, Agent, or Firm* — Hartman Global IP Law; Gary M. Hartman; Domenica N. S. Hartman

(57) ABSTRACT

A method for anti-counterfeit inspection of a QR code of an agricultural product based on a watermark library. The method includes establishing a watermark-containing QR code library; tracing a QR code watermark image; and verifying the QR code watermark image. Watermark-containing QR codes are generated by a QR code generation module and a watermark library, and the watermark-containing QR codes are constructed as the watermark-containing QR code library. The watermark-containing QR code library is used to verify the QR code watermark image, and the QR code watermark image is obtained by tracing the watermark-containing QR codes. In the method for anti-counterfeit inspection of a QR code of an agricultural product based on a watermark library, an image watermark library is designed, so that the embedding of a watermark is no longer single.

1 Claim, 1 Drawing Sheet

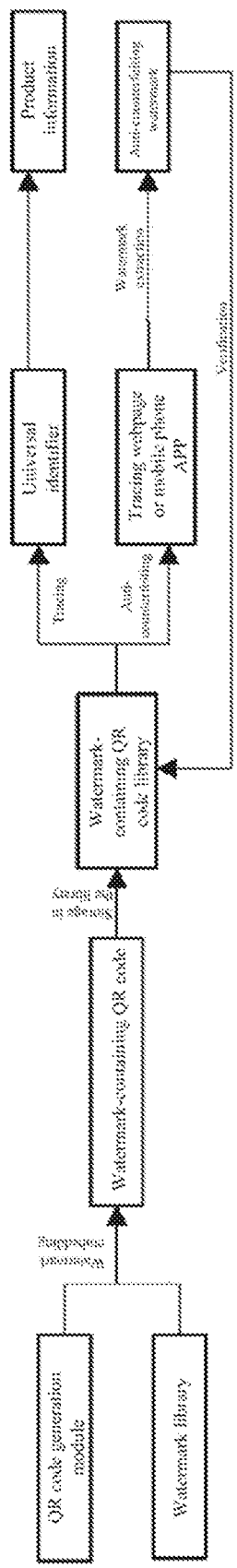

METHOD FOR ANTI-COUNTERFEIT INSPECTION OF QR CODE OF AGRICULTURAL PRODUCT BASED ON WATERMARK LIBRARY

CROSS REFERENCE TO RELATED APPLICATIONS

This application claims priority to Chinese Patent Application No. 201910991205.3 filed Oct. 18, 2019, the contents of which are incorporated herein by reference.

TECHNICAL FIELD

The present invention belongs to the field of information identification, and particularly relates to a method for anti-counterfeit inspection of a QR code of an agricultural product based on a watermark library.

BACKGROUND

A digital watermarking technology is to seek an optimal design that can meet constraints of robustness, imperceptibility, safety and reliability through reasonable optimization of several technical links such as information embedding location selection, analysis of a watermark carrier medium and design of an embedding mode. At present, the most widely used QR code anti-counterfeiting method is to form a corresponding traceability code through certain coding rules. The traceability code is similar to an ID code of a product. Each product has its own unique traceability code, and the design of the traceability code is uniformly coded according to certain rules. This unique code corresponds to a QR code of a product package. Therefore, the QR codes of all products are unique, and QR code anti-counterfeiting is implemented by the combination of a traceability code and product information. However, the combination of a unique identification traceability code and product information for QR code anti-counterfeiting cannot meet the requirements of QR code anti-counterfeiting, because the traceability code itself is open although unique, and there are cases where the traceability code is cracked. Besides, a QR code of a product can be forged by directly copying the QR code.

SUMMARY

The present invention provides a method for anti-counterfeit inspection of a QR code of an agricultural product based on a watermark library. The image watermark library is designed, so that the embedding of a watermark is no longer single. Even if an attacker cracks one of barcodes, the influence on a whole QR code watermarking system is not large, and a watermark extraction algorithm cannot work without separating from an image watermark feature library, thus further increasing the reliability of the system.

In order to achieve the forgoing objective, the technical solution adopted by the present invention is as follows: a method for anti-counterfeit inspection of a QR code of an agricultural product based on a watermark library, including step 1. establishing a watermark-containing QR code library; step 2. tracing a QR code watermark image; and step 3. verifying the QR code watermark image, where step 1 specifically includes: generating Watermark-containing QR codes by a QR code generation module and a watermark library, and constructing the watermark-containing QR codes as the watermark-containing QR code library, where the watermark-containing QR code library is used to verify the QR code watermark image, and the QR code watermark image is obtained by tracing the watermark-containing QR codes.

Further, step 2 specifically includes: identifying, by a tracing module through a universal identifier, the watermark-containing QR codes to obtain product information, and extracting, by an anti-counterfeiting module, the watermarks in the watermark-containing QR codes and comparing the extracted watermarks with data in the watermark-containing QR library for verification.

Further, the anti-counterfeiting module extracts the watermarks in the watermark-containing QR codes through a tracing webpage or a mobile phone APP.

The present invention has the following technical effects: the core foundation of an agricultural product traceability QR code anti-counterfeiting system is a QR code watermark embedding and extracting algorithm constructed based on an image watermark library; an image watermark is randomly selected in the watermark library to be embedded in a currently generated QR code, and a QR code plain code and a watermark number are stored in a QR code library; the QR code with the embedded watermark and production information written in plain text form can be read by an open standard reader, while watermark information in ciphertext form can only be extracted and identified through webpage tracing, thus meeting the dual requirements for traceability and identification of authenticity of QR code labels. Traceability QR codes are generated in a mode of one code corresponding to one product, and the verification times can be dynamically set. If the verification times are exceeded, reminding information on possible imitation and the verification times of the product is returned, thus ensuring the anti-counterfeiting property of the existing traceability QR codes and the safety of the system.

BRIEF DESCRIPTION OF THE DRAWINGS

FIG. 1 is a flowchart of the present invention.

DETAILED DESCRIPTION

Referring to FIG. 1, a method for anti-counterfeit inspection of a QR code of an agricultural product based on a watermark library includes step 1. establishing a watermark-containing QR code library; step 2. tracing a QR code watermark image; and step 3. verifying the QR code watermark image, where step 1 specifically includes: generating Watermark-containing QR codes by a QR code generation module and a watermark library, and constructing the watermark-containing QR codes as the watermark-containing QR code library, where the watermark-containing QR code library is used to verify the QR code watermark image, and the QR code watermark image is obtained by tracing the watermark-containing QR codes. The purpose of establishing the watermark-containing QR code library is to prevent illegal vendors from carrying out "pseudo-authentication" attacks on traceability QR codes, and to prevent the illegal vendors from starting work by establishing a huge watermark library. In addition, the data size of the QR code is relatively small, and the amount of the embedded watermark is also relatively small. If the selected watermark image is large, the watermark cannot be completely embedded during embedding, resulting in inaccurate watermark extraction. Therefore, it is necessary to compress the image and extract features of the compressed watermark image to reduce the size of the watermark image. In the image watermark library, the watermark image is preprocessed by edge extraction through wavelet transform to further reduce the size of the watermark image and further concentrate energy of the image. When the watermark-containing QR code is attacked, a detection system can respond quickly.

Preferably, step 2 specifically includes: identifying, by a tracing module through a universal identifier, the watermark-containing QR codes to obtain product information, and extracting, by an anti-counterfeiting module, the watermarks in the watermark-containing QR codes and comparing the extracted watermarks with data in the watermark-containing QR library for verification. In the tracing, the main purpose of the watermark of the QR code is to resist "pseudo authentication" attacks. The main purpose of this attack method is not to remove the watermark information, but to tamper with digital information of a carrier immediately, so that the system can still detect watermark information, thus confusing the anti-counterfeiting system and enabling the tampered digital information to pass the authentication. The system uses semi-fragile watermarking based on wavelet transform to attack the "pseudo-authentication" while protecting the process of adding and extracting the watermark. In order to improve the identifiability of the embedded watermark QR code, the system chooses an original QR code image with an appropriate size and a reasonable error correction rate as a watermark carrier.

Preferably, the anti-counterfeiting module extracts the watermarks in the watermark-containing QR codes through a tracing webpage or a mobile phone APP.

What is claimed is:

1. A method for anti-counterfeit inspection of a QR code of an agricultural product based on a watermark library, comprising:

randomly selecting a watermark image in a watermark library; and embedding the selected watermark image in a currently generated QR code to generate a watermark-containing QR code, the embedding comprising preprocessing the selected watermark image by edge extraction through wavelet transform, compressing the preprocessed watermark image, and extracting features of the compressed watermark image;

constructing the watermark-containing QR codes as the watermark-containing QR code library, wherein the watermark-containing QR code library is used to verify the QR code watermark image, and the QR code watermark image is obtained by tracing the watermark-containing QR codes;

identifying, by a universal identifier, the watermark-containing QR codes to obtain product information;

extracting, by a tracing webpage or a mobile phone APP, the watermarks in the watermark-containing QR codes; and comparing the extracted watermarks with data in the watermark-containing QR library for verification.

\* \* \* \* \*